June 29, 1937.  S. B. HILL  2,085,156
FLOATING BRIDGE
Filed April 22, 1933  4 Sheets-Sheet 1
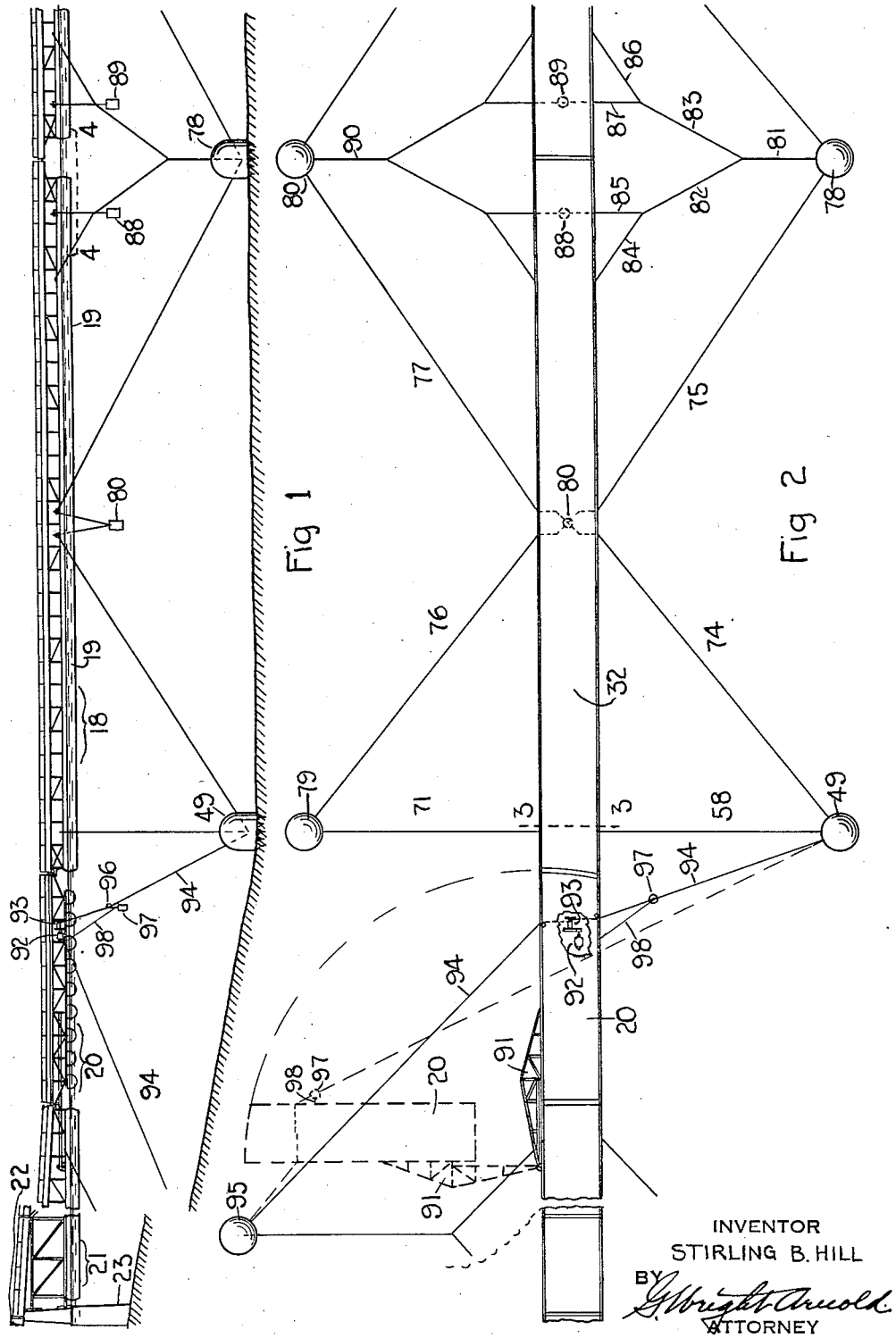
INVENTOR
STIRLING B. HILL
BY
*G. Wright Arnold*
ATTORNEY

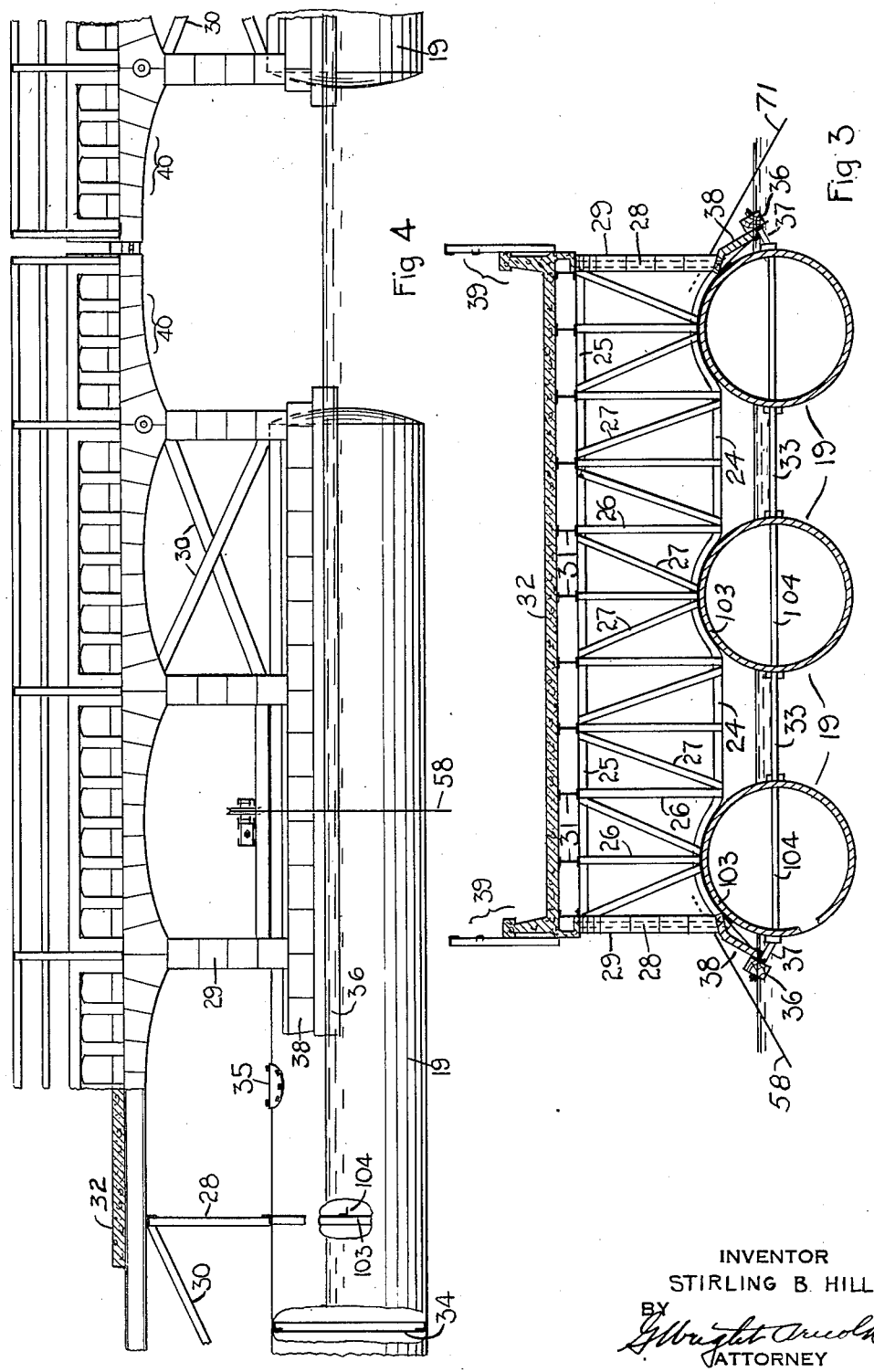

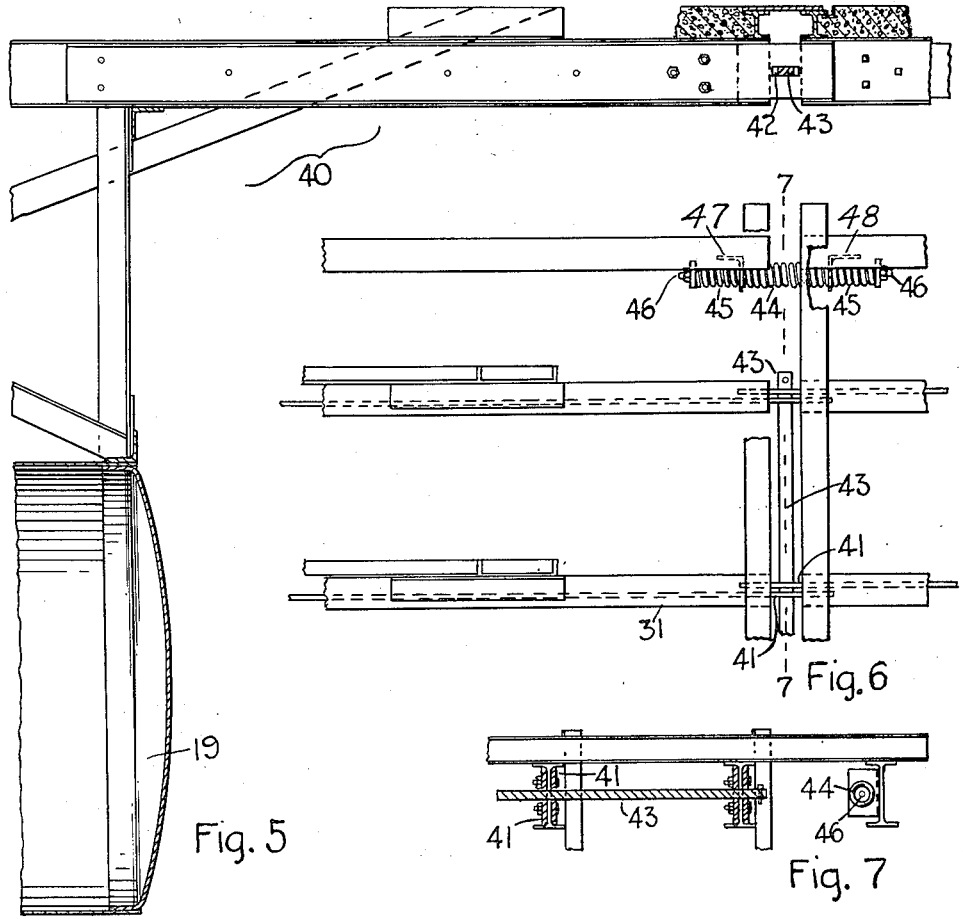
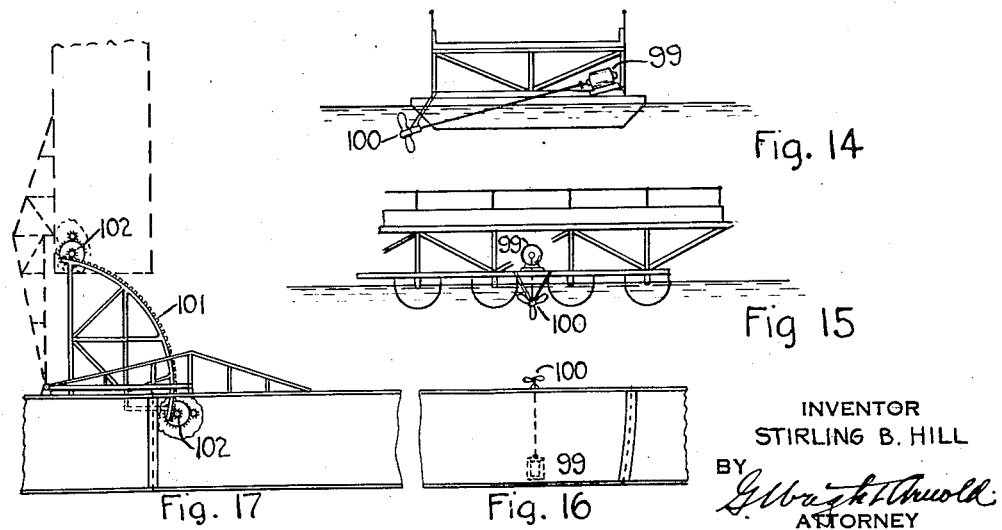

June 29, 1937.                S. B. HILL                 2,085,156
                            FLOATING BRIDGE
                     Filed April 22, 1933         4 Sheets-Sheet 4
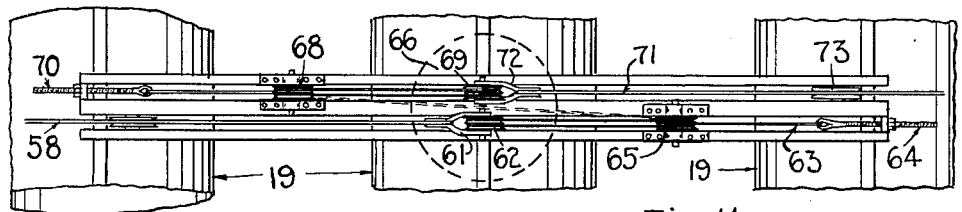
Fig. 11
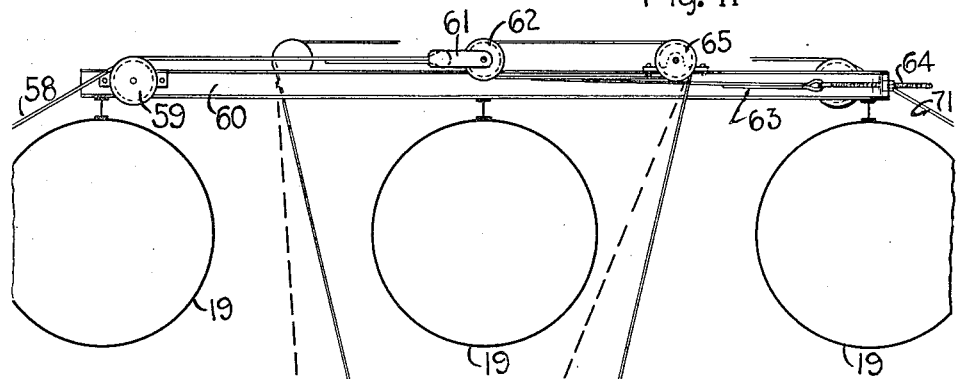
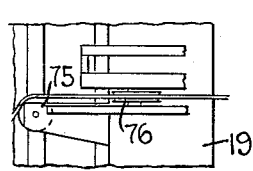
Fig. 13
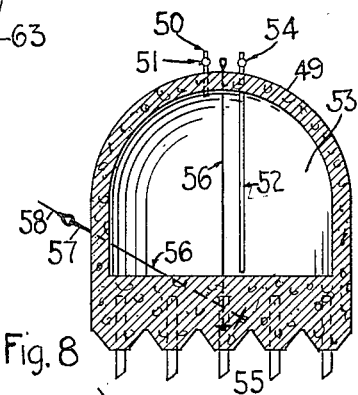
Fig. 8
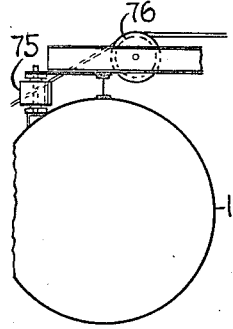
Fig 12
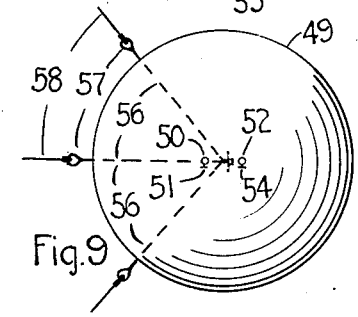
Fig. 9
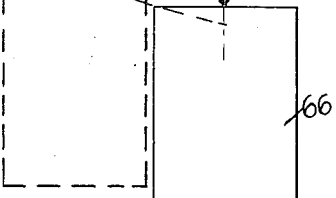
Fig 10
INVENTOR
STIRLING B. HILL
BY
ATTORNEY Patented June 29, 1937

2,085,156

UNITED STATES PATENT OFFICE 2,085,156

FLOATING BRIDGE

Stirling B. Hill, Seattle, Wash.

Application April 22, 1933, Serial No. 667,355

5 Claims. (Cl. 14—27)

My invention relates to the art of floating bridges. More particularly, my invention relates to a bridge having relatively long floating tubular members extending lengthwise of the bridge, said members functioning as the bridge supporting means.

At the present time there are many municipalities bordering on bodies of water (lakes or rivers) which seriously interfere with the traffic ways leading to the city, including arterial highways. These bodies of water may be very deep, so that the construction of fixed abutments for bridges are unpractical or too costly. Also, such bodies of water may have their shores widely separated so that a long span is involved. Under such circumstances the usual solution at the present time is to employ ferries or to make circuitous routes around the body of water, the latter being true where the body is a lake. Much inconvenience results from having to reach the ferry landing at specified times, as well as much time is lost waiting for the departure of the ferry. Also, the time of transit by ferry is much longer than the crossing time by bridge.

Existing types of pontoon bridges are unsatisfactory under the above conditions, because they are unsightly. The cost of pontoon construction, and the necessary longitudinal trusses between pontoons is excessive. Furthermore, the pontoon or the buoyant elements are localized so that wave action causes too much motion in short sections of the bridge to be safe for high speed and general public traffic over the bridge supported by the pontoons.

The object of my invention is to provide a bridge structure characterized by its safety, economic construction, its flexibility, stability and adaptability for bodies of water which are relatively deep, and particularly where a long span is involved. Also a bridge that lends itself readily to pleasing architectural treatment.

A primary purpose of my invention is to provide a bridge structure, the construction of which is possible in situations where no other presently designed bridge is considered possible or practical. In general, I purpose to overcome the objection obtaining to present solutions of spanning wide deep bodies of water.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a fragmentary view in side elevation of the approach, a draw, and a standard section of a floating bridge embodying my invention;

Fig. 2 is a plan view of the same;

Fig. 3 is a view in cross-section on dotted line 3—3 of Fig. 2;

Fig. 4 is a view in longitudinal section on dotted line 4—4 of Fig. 1, with fragments broken away to show concrete covering broken away in part and a portion of the longitudinal tube removed to show bulkhead, and internal reinforcement;

Fig. 5 is an enlarged view, with parts broken away, in side elevation of the end portion of a standard floating section showing connecting means between standard floating sections;

Fig. 6 is a fragmentary plan view of the connecting means joining the end portions of two standard sections;

Fig. 7 is a view in cross section on dotted line 7—7 of Fig. 6;

Fig. 8 is a view in vertical section of an anchor means;

Fig. 9 is a top view of said anchor means;

Fig. 10 is a view transversely of the tubes showing the mounting of the anchor-counterweight cables;

Fig. 11 is a plan view of the same;

Fig. 12 is a detailed view of the mounting on a lateral floating tubular member of the diagonal anchor-counterweight cable;

Fig. 13 is a plan view of said diagonal anchor-counterweight cable mounting;

Fig. 14 is an end view of a modified form of a drawbridge employing a propeller as the actuating means for the leaf of said drawbridge;

Fig. 15 is a view in side elevation of said modified form of drawbridge;

Fig. 16 is a fragmentary plan view of said modified form of drawbridge or swing span; and Fig. 17 is a plan view of still another modified form of drawbridge, which form employs a rack means for actuating the movable section.

A floating unit 18, standard in the structure embodying my invention is formed of relatively long longitudinally disposed tubes 19 arranged in two or more parallel lines as floating supports for the bridge super-structure. A floating drawbridge section 20, preferably shorter in length than the standard unit section just described, may be located in the bridge as shipping traffic requires. A floating section 21, embodying my invention may support an incline roadway thereabove to form a part of the approach at the end of the bridge. The rest of the approach 22, over relatively shallow water, may be built on regular fixed abutments 23. The construction of the units 18, standard to my construction and forming the primary members spanning the waterway, may be constructed, as herein shown, with three lines of partially submerged longitudinally disposed tubes 19.

These tubes are fixedly held with respect to each other by the bridge superstructure comprising horizontally disposed members 24 and 25, (Figs. 3 and 4) and vertically disposed members 26 diagonal or trussing members 27. The outermost vertical members 28 are preferably provided with a concrete structure 29, to provide artistic appearance for the bridge. Longitudinally disposed truss members 30 reinforce the bridge superstructure and are located on the line of the tubes, i. e., back of the lateral face of the bridge. I beams 31 may be located on top of horizontal member 25, and roadbed 32 of concrete or other suitable material may be disposed on top of I beams 31. Furthermore, brace members 33 may be disposed below the water line to further hold the longitudinally disposed tubes 19. These tubes 19 are a plurality of times longer than the width of the roadway and are preferably supplied with bulkheads 34 and manholes 35 at intervals.

Guard beam 36 may be mounted on the laterally longitudinally disposed tube and on support 37, and an incline bracing member 38. The tubes are designed of a size to support the weight of the bridge structure with the water level disposed above the horizontal axes of the tubes, i. e., with the tubes largely, i. e., for the most part, submerged to minimize the force of the wave action against the tubes, and reduce excess buoyancy and movement arising from the lifting effect of the waves. The guard bracing member 38 is continuous throughout the length of the tube of the bridge section unit to permit the larger waves to roll over the tube to further minimize the force of wave action on said tubes. A suitable guard rail 39 is disposed along the sides of the bridge. The means for uniting the floating units may comprise a projecting or cantilever-like extension 40 (particularly Figs. 4, 5, 6, and 7) carried by the end portions of the sections where it is necessary or desirable to allow for small boat passages at intervals.

The extension portion of the end portion of the centrally disposed I beams 31 are preferably reinforced by splice plates 41, which plates may extend a short distance beyond the end of the I beam members 31. In these plates 41, a slot 42 is provided. These plates are telescopically related, and alternate as to sides of the web of the I beam of adjacent floating units, (see Fig. 6). Through these slots 42 a key member 43 is located. The key member 43 is preferably slightly less in width than the slot, so as to leave room for some play on each side thereof, (see Fig. 5).

The lateralmost disposed I beams are provided with heavy spring members 44 and 45 mounted on a rod 46, which rod is mounted in projections 47 and 48. The central spring 44 presses the joining floating units apart, while the end springs 45 exert a force tending to hold the units together.

The construction of the anchoring means, anchoring cables and counterweight means for the floating units will next be considered. Anchoring means of hollow construction, as anchor 49, see particularly Figs. 8 and 9, may be constructed on shore. These may be formed of concrete with a short air venting pipe 50 provided with air valve 51 and a long water pipe 52 reaching almost to the bottom of the chamber 53 of the anchor means, and this water pipe is provided with a valve 54. The bottom portion of the anchor means is preferably provided with heavy iron teeth 55 which extend beyond the concrete for gripping the bottom of the body of water. Preferably embedded in the concrete structure are suitable iron rods 56 with eyelets 57 to serve as cable securing means. These anchors 49 are floated to the desired location, with the cables attached, and then valve 54 is opened and the anchor sunk to position, with air valve 51 also in open position to permit water to enter chamber 53. Anchoring cable 58, secured in eyelet 57, as respects one end, is passed over sheave 59, fixedly mounted on cross beam 60 and secured to yoke 61 of sheave 62. Cable 63 with one end secured to an adjustably mounted threaded rod 64 is reeved about sheave 62 and then around sheave 65 which is fixedly mounted on beam 60, and then preferably (obviously alternate to get desired mechanical advantage) back around sheave 62 and again through sheave 65 and then down to counterweight 66.

Another cable 67 is secured to counterweight 66 and reeved through sheaves 68 and 69, similarly as in the case of sheaves 65 and 62 respectively and secured to rod 70. Another anchoring cable 71 is secured to yoke 72 of sheave 69 and reeved over sheave 73 to extend out on the side of the bridge opposite to cable 58.

Diagonal cables 74, 75, 76, and 77, secured respectively to anchors 49, 78, 79, and 80 are passed around guide rollers, such as roller 75 mounted on laterally disposed tube 19, and then over sheave 76, so as to be secured to a counter mechanism which is similar to that described above for anchoring cable 58 and 71, counterweight 80 serving all four diagonal anchoring cables.

For the ends of the floating unit, separate anchoring means may be provided in the form of a bridle cable 81 having branch cables 82 and 83. These branch cables in turn are divided into branch cables 84 and 85, and 86 and 87, respectively. Branch cables 84 and 86 may be suitably secured to the bridge structure without any counterweight means, while branch cables 85 and 87 may be secured to counterweights 88 and 89, respectively, through suitable counterweight means, in all respects similar in construction to that of cable 58. A similar bridle cable 90 is provided on the opposite side of the bridge.

The drawbridge 20 may be hingedly mounted by means of truss structure 91. An electric motor 92, or other suitable source of power, and a winding drum 93 may be provided on the outermost end of said drawbridge. A cable 94 may be secured to anchors 49 and 95, and reeved around drum 93, whereby when the drum is operated, it will operate to move the drawbridge into open position, as shown in dotted line, Fig. 2, or into closed position as shown in full lines. Mounted on cable 94 is a sheave 96 from which a weight 97 is suspended. Line 98 may be fastened to weight 97 and the swing span or drawbridge 20. The object of this weight is to take up the slack in cable 94 and keep same taut while the draw span is being opened, and when the span is in open position, to sink cable 94 below contact with ships passing through open draw. A modified form of the drawbridge or swing span may be employed, as shown in Figs. 14, 15 and 16. An electrically driven motor or engine 99 may be located on the outermost end of the drawbridge, and a screw propeller 100 provided for moving the drawbridge into open and closed position, reversing the motor when the closing of the span is desired.

In the modified form shown, Fig. 17, a rack 101 and pinion 102 is shown as the means for opening and closing the swing span.

The mode of operation of the device embodying my invention will be understood for the most part from the description already given. Tubes, circular in cross section, provide the easiest and cheapest form of float construction. They are simple and easy to make and require a minimum of framing and bracing. Annular rings 103 and angle bars 104 function as bracing members. Tubes disposed longitudinally, as described herein, have the dual function of providing the necessary floating element to support the bridge superstructure and also furnish all the longitudinal strength and stiffness required. The tubes being directly under the bridge roadway (said roadway defining herein the width of the bridge) and in close proximity thereto, all bridge loads may be transferred directly to the supporting tubes by light weight members. Even in a wide bridge designed for the heaviest highway traffic, no heavy truss members will be required. Since the tubes of my invention are relatively long, they are subject to a plurality of waves. Hence, the wave action is averaged, and the displacement of the tubes reduced to a minimum.

It is manifest that the relatively long longitudinally disposed tubes 19, largely submerged, will form an exceedingly stable supporting structure. These tubes may be some four hundred feet in length—their precise length, in addition to the factors herein otherwise set forth, depending upon the special requirements or conditions of the individual bridge, as well as upon the economic design of the structure. Being largely submerged, the force of waves against the sides will be greatly minimized, and their movement vertically very sluggish. The member 38 will serve to divide the force of the wave and allow it to pass partly over, and partly beneath, the tube 19. Having the tubes in spaced relation, transversely considered, provides for suitable mounting of the anchoring cables and counterweights, and also by having the tubes of a size which requires two or more provides for the necessary width of roadbed, as well as lateral stability. Having manholes 35 permits of ready access to the interior of the tubes for inspection purposes to guard against leaks, and in the case of an accident to the tubes, the bulkheads 34 provide for localizing the effects of such injury. Furthermore, the providing of several tubes for each unit obviously provides for widening the roadbed in a very economical manner, as it is only necessary to add another tube with the necessary bridge superstructure.

Such bridge structure, manifestly provides for a most economical construction throughout. These units may be made on shore and then readily floated to position. In a bridge spanning a lake, the shores of which are one-half or more miles apart, the cost of construction is about one-third of what would be the cost of the standard bridge construction with fixed abutments where the water is one hundred feet deep. This ratio will increase with added depth of water, until the fixed bridge becomes impractical or impossible.

The anchoring means is characterized by providing a very important feature of the bridge, namely, flexibility and the proper distribution of the strain to the respective anchor cables. The cables from the anchors must be attached to the bridge by suitable adjustment means to compensate for changes of water level. On a long bridge this operation would be burdensome and result in uneven strains on the cables unless great care is exercised.

The preferred method is by means of counterweights as described. The cables from the anchors on either side may pass directly over a sheave and down to the counterweight. The introduction of the multiple ply pulley reduces the size of the counterweight required and lightens the load on the bridge correspondingly. A further advantage of the pulley is that the motion of the cable leading from the pulley to the counterweight will be a multiple of lateral movement of the bridge. With bridle arrangement shown in Fig. 2, and sheaves as shown in Fig. 10, the movement of the counterweight cable will be eight times the lateral movement of the bridge. Normally and with no external forces acting, the counterweight will hang in the center position, as shown in full lines in Fig. 10, and the strain on all similar anchor cables will be equal. A side force acting on the bridge will move it laterally, causing one cable to the counterweight to shorten and the other lengthen, causing the weight to shift to one side, as shown by dotted lines in Fig. 10. In this position, the major strain will be on the shortened cable. A very slight movement of the bridge will bring the forces to balance. A movement of two or three inches may throw the entire strain on the resisting cables, if there is sufficient external sidewise directed forces to require it. The diagonally disposed cables also operate to resist longitudinally directed forces. The counterweight arrangement automatically holds the bridge in true position with changing water levels.

The anchors will be so placed that the anchor cables will have the proper vertical angle, so that the moment of the cable pull about the center point of buoyancy will balance the overturning moment of the side wind pressure on the bridge. That is, the wind will tend to tip the bridge one way, and the down pull of the resisting cable will tip it the opposite way. The point of contact and angle of the cable from this point to anchor may be such that these two opposite forces will balance or neutralize each other. The anchors placed opposite the junction of sections allows the bridle arranged connection from single anchors to ends of adjacent sections and equalizing the strains on the cables, even should one anchor drag a few feet.

The slotted key grooves 42 allow for the necessary expansion and contraction. The key transfers vertical pressure from the end of one section to the next. It permits the necessary vertical and side movement of the joint, yet holds the road surface in perfect alignment. With the bridge uniformly loaded there will be little or no force transmitted through the uniting joint means, but when one section is loaded, and adjacent sections not so heavily loaded, a part of the load will be transferred to the end of the adjacent section, whenever such load on a given section is excessive. The difference in the loading will be largely compensated for by increased buoyance, due to increased submergence of the loaded section.

Another advantage of the long tube construction is that while the tubes have ample longitudinal strength and stiffness to carry the bridge and any loading that will be placed thereon, yet are sufficiently flexible that in a long length they may safely bend or sag sufficiently to largely compensate for concentrated loading on one section, and thus, by increased submergence and resultant increased buoyancy in the mid portion, further limit the vertical load that may be transferred from one section to another. In general, the weight of the structure and roadway will sink the tube floats uniformly about two-thirds their depth. The full moving load will cause additional submergence of only three to six inches. Thus, the deflection, no matter how long the tubes, will be limited to a few inches, and in no case will the strain, caused by such deflection, approach the limit of safe strain on the metal of the tubes.

The moving traffic will create stresses longitudinally directed of the bridge, and manifestly having the long tubes of my invention with their longitudinal axis disposed lengthwise of the bridge, enables them to most efficiently receive and distribute such stresses.

Obviously, changes may be made in the forms, dimensions and arrangement of the parts of my invention, without departing from the principle thereof, the above setting forth only preferred forms of embodiment.

I claim:

1. A bridge embodying a plurality of floating units, each unit comprising a plurality of floating tubular members, extending lengthwise of the bridge, said members functioning as the bridge supporting means and being a plurality of times longer than the width of said bridge; and anchoring means for said floating units, said means comprising anchors in laterally spaced relation to the bridge, cables having one end secured to said anchors and extending transversely of the bridge in opposite directions from the bridge, other cables secured to said anchors and extending diagonally as respects the bridge, sheave means on the bridge over which the cables pass, counterweight means operatively connected with the transversely extending cables yieldingly resisting side deflection of the bridge, and other counterweight means operatively connected with said diagonally extending cables yieldingly resisting longitudinal movement of the bridge.

2. A bridge embodying a plurality of floating units, each unit comprising a plurality of floating tubular members, extending lengthwise of the bridge, said members functioning as the bridge supporting means and being a plurality of times longer than the width of said bridge; and anchoring means for said floating units, said means comprising anchors in laterally spaced relation to the bridge, cables disposed in pairs, each cable thereof extending to the opposite side of the bridge and having one end secured to said anchors, and the other end of each cable of said pairs fastened to a separate multiple pulley means, each of which means has a cable secured to the floating unit as respects one end thereof, and the other end secured to a counterweight, whereby said counterweight serves both of said cables of said pair and the weight of said counterweight is reduced, whereby its load on the floating unit is minimized.

3. A bridge embodying a plurality of floating units; and anchoring means for said floating units, said means comprising anchors in laterally spaced relation to the bridge, cables extending transversely in opposite directions from the bridge and each having one end secured to said anchors, laterally spaced apart sheave means on the bridge over which the cables pass and a counterweight means operatively connected with cables extending to both sides of the bridge yieldingly resisting side deflection of the bridge.

4. A bridge embodying a plurality of floating units; and anchoring means for said floating units, said means comprising anchors in laterally spaced relation to the bridge, cables disposed in pairs, each cable thereof extending to the opposite side of the bridge and having one end secured to said anchors, and the other end of each cable of said pairs fastened to a separate multiple pulley means, each of which means has a cable secured to the floating unit as respects one end thereof, and the other end secured to a counterweight, whereby said counterweight serves both of said cables of said pair, and the weight of said counterweight is reduced, whereby its load on the floating unit is minimized.

5. A bridge embodying a plurality of floating units, each unit comprising a plurality of floating tubular members, extending lengthwise of the bridge, each of said members being submerged for the most part of their depth, said members functioning exclusively as the bridge supporting means and being a plurality of times longer than the width of said bridge, whereby the objectionable effect of wave action is overcome, and at the same time the buoyant force of the tubes is advantageously utilized; and anchoring means for said floating units, said means comprising anchors in laterally spaced relation to the bridge, cables disposed in pairs, each cable thereof extending to the opposite side of the bridge and having one end secured to said anchors, and the other end of each cable of said pairs fastened to a separate multiple pulley means, each of which means has a cable secured to the floating units as respects one end thereof, and the other end secured to a counterweight, whereby said counterweight serves both of said cables of said pair and the weight of said counterweight is reduced, whereby its load on the floating unit is minimized.

STIRLING B. HILL.